(12) United States Patent
Kantor et al.

(10) Patent No.: US 11,257,030 B1
(45) Date of Patent: Feb. 22, 2022

(54) AGGREGATING RFID EVENTS TO DETERMINE A LOCATION

(71) Applicant: Amazon Technologies, Inc., Seattle, WA (US)

(72) Inventors: Oleg Kantor, Kirkland, WA (US); Tak Keung Joseph Lui, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 479 days.

(21) Appl. No.: 15/861,355

(22) Filed: Jan. 3, 2018

(51) Int. Cl.
*G06Q 10/08* (2012.01)
*G06K 7/10* (2006.01)

(52) U.S. Cl.
CPC ....... *G06Q 10/087* (2013.01); *G06K 7/10366* (2013.01)

(58) Field of Classification Search
CPC .................................................. G06Q 10/087
See application file for complete search history.

(56) References Cited

U.S. PATENT DOCUMENTS

| 7,518,511 | B1 * | 4/2009 | Panj | G06Q 10/08 340/572.1 |
| 9,852,319 | B1 * | 12/2017 | Pesavento | G06K 7/10128 |
| 2010/0051692 | A1 * | 3/2010 | Knudson | H05K 9/0067 235/439 |
| 2011/0199211 | A1 * | 8/2011 | Campero | G06K 7/0008 340/572.1 |
| 2014/0079282 | A1 * | 3/2014 | Marcheselli | G07C 9/00 382/103 |
| 2014/0350715 | A1 * | 11/2014 | Gopalakrishnan | G06Q 10/087 700/215 |
| 2018/0300671 | A1 * | 10/2018 | Richardson | G06Q 10/087 |
| 2019/0188545 | A1 * | 6/2019 | Locke | G06K 7/10356 |

* cited by examiner

*Primary Examiner* — Florian M Zeender
*Assistant Examiner* — Whitney Poffenbarger
(74) *Attorney, Agent, or Firm* — Patterson + Sheridan, LLP (57) ABSTRACT

Embodiments herein describe aggregating RFID events before determining a location of an RFID tagged item. For example, a warehouse may be divided into different zones in which the RFID tagged item is tracked. An inventory tracking system may require that at least one RFID reader detect the RFID tagged item a threshold number of times before determining that the item is at the location corresponding to the reader. Thus, even if RFID readers at neighboring locations in the zone also detect the RFID tagged item, the inventory tracking system determines the location with the most RFID events is the most likely location of the package. By aggregating RFID events, the inventory tracking system can provide a more accurate location of the RFID tagged item in a noisy environment or an environment with a high density of RFID readers.

18 Claims, 6 Drawing Sheets

AGGREGATING RFID EVENTS TO DETERMINE A LOCATION

BACKGROUND

The present invention relates to aggregating radio frequency identification (RFID) events before determining a location of an RFID tagged item.

Shipping packages typically involves moving the packages to different locations in a shipping warehouse in preparation for the packages being loaded onto trucks. Shipping warehouses can use RFID systems to track inventory. RFID tags, which can be passive or active, are disposed on the inventory (e.g., individual packages or pallets) in the warehouse and are programmed with information identifying the associated inventory. The identifying information is read from the RFID tags by RFID readers. In one example, the RFID readers are located at loading docks or along conveyor belts so that the RFID system can detect when RFID tags (and the corresponding inventory) pass through.

However, in noisy or dense environments (e.g., environments with high density of RFID readers), a stationary package can be detected by multiple RFID readers which are assigned to different locations in the warehouse. For example, during a first time instance, an RFID tagged package located in a loading zone for a first dock door may be detected by the RFID reader at that location. However, as the environment changes, during a second time instance the RFID tagged package may be detected by a RFID reader at a neighboring dock door. In response, an inventory tracking system may mistakenly determine the package has been moved to a different dock door (e.g., a false positive) and dispatch an associate to move the package back to the loading zone for the first dock door when in fact the package is stationary and has not changed dock door locations. As such, these false positives can generate false troubleshooting events which unnecessarily add to the workload of the associates in the warehouse.

BRIEF DESCRIPTION OF DRAWINGS

Various embodiments in accordance with the present disclosure will be described with reference to the drawings, where like designations denote like elements.

DETAILED DESCRIPTION

Embodiments herein describe aggregating RFID events before determining a location of an RFID tagged item. For example, a warehouse may be divided into different zones—e.g., an item storage zone, an item packaging zone, a sortation zone, and a shipping zone—in which the RFID tagged item is tracked. For some of these zones, an inventory tracking system evaluates multiple RFID events (e.g., multiple RFID reads) before deciding the location of the item or package in the zone. For example, the shipping zone may be subdivided into different loading areas for dock doors that each have their own RFID readers. The tracking system may require that at least one RFID reader detect the RFID tagged item a threshold number of times before determining that the item is at the loading zone for the corresponding dock door. Thus, even if RFID readers at neighboring dock doors also detect the RFID tagged item, the inventory tracking system determines the location with the most RFID events is the most likely location of the package. By aggregating RFID events, the inventory tracking system can provide a more accurate location of the RFID tagged item in a noisy environment or an environment with a high density of RFID readers.

Figure 1:
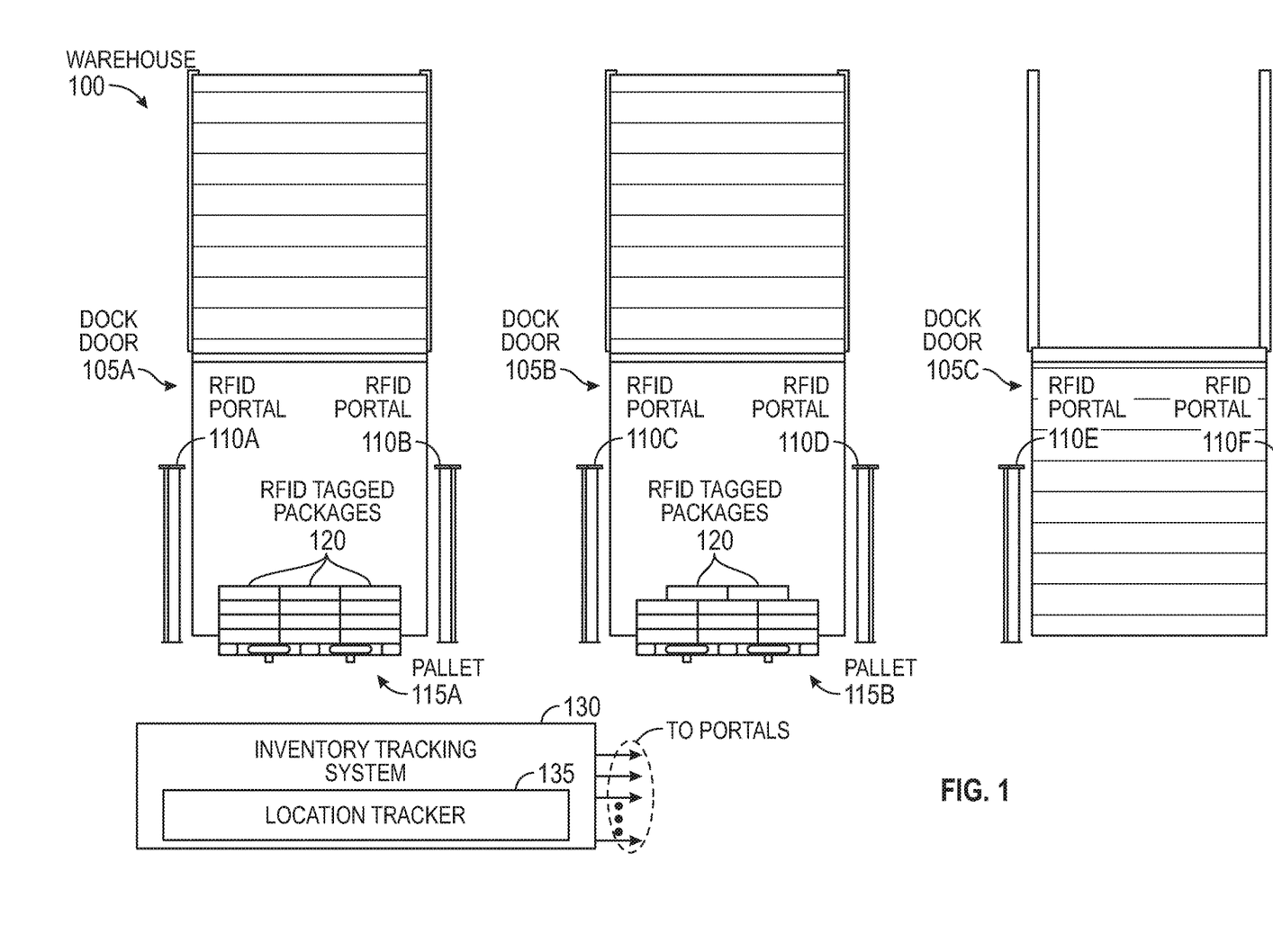
FIG. 1 is a warehouse with a plurality of dock doors with corresponding RFID portals, according to various embodiments.

FIG. 1 is a warehouse 100 with a plurality of dock doors 105 with corresponding RFID portals 110, according to various embodiments. As shown, each dock door 105 has a pair of RFID portals 110 which detect RFID tagged packages 120 in a loading zone in front of the dock door 105. Although in this embodiment, the RFID tags are disposed on each of the packages 120, in other examples, the pallets 115 may have a RFID tag, or the items inside of the packages 120 may have RFID tags.

The RFID portals 110 each include at least one RFID reader and antenna for detecting RFID tags on the packages 120. For example, an associate may move the pallet into the loading zone in front of the dock door 105 which is within wireless range of the RFID antenna and readers in the portals 110. As such, the RFID reader can receive unique IDs from the RFID tagged package 120 which can be used to track the packages 120 as they move throughout the warehouse 100. In one embodiment, the RFID portals 110 forward the unique IDs to an inventory tracking system 130 which includes a location tracker 135 which maps the unique IDs to items in the packages 120 to identify the current location of the packages 120 in the warehouse 100. Moreover, the location tracker 135 can compare the current locations of the packages 120 as reported by the RFID portals 110 to a desired location of the packages 120. For example, the RFID tagged packages 120 in the pallet 115A are in front of the dock door 105A, and thus, are detected by the RFID portals 110A and 110B. However, the location tracker 135 may determine that the associate should have moved the pallet 115 in front of the dock door 105C. As such, the location tracker 135 can provide feedback to the associate to move the pallet 115A from the loading zone in front of the dock door 105A to the loading zone for the dock door 105C.

As packages 120 are brought into the loading zone, they pass between a pair of the RFID portals 110 and are detected by their RFID readers. In another embodiment, instead of using a pair of portals 110 for each dock door 105, an RFID portal may be disposed on the wall next to the dock doors 105 that has an antenna facing towards the loading zone. In another example, an RFID portal may be disposed over the loading zone with an antenna that faces down towards the floor of the warehouse 100. In any case, the RFID readers in the portals can detect the RFID tags as the packages 120 are moved in front of the dock doors 105.

Because the packages 120 and pallets 115 may be stationary, the RFID portals 110 can continue to detect the RFID tags when performing additional read cycles. That is, the RFID portals 110 may continue to inform the location tracker 135 when they detect the RFID tags in subsequent read cycles. As shown, the dock doors 105 and the RFID portals 110 are in close proximity. For example, the RFID portal 110B may be only a few feet away from the RFID portal 110C. As such, the read regions of the portals 110 (e.g., the area in which the RFID reader in an RFID portal can detect a tag) may intermittently extend into neighboring loading zones. Moreover, the extent to which the read regions extend into neighboring loading zones can change depending on environmental factors. For example, a hand truck moving from the dock door 105B to the dock door 105A may reflect or interfere with the read region of the RFID portal 110 such that its read region extends into the loading zone for the dock door 105B. Similarly, the read region for the RFID portal 110D may temporarily extend into the loading zone for the dock door 105A. Thus, during one read cycle, the RFID portal 110D may detect an RFID tag on the pallet 115B or the RFID portal 110D may detect a tag on the pallet 115A.

Because of the noisy and high density RFID environment in the warehouse 100, the read regions of the RFID portals 110 can extend into the loading zones for neighboring dock doors. As a result, the location tracker 135 may mistakenly determine that a package 120 is in the wrong loading zone. For example, when moving the pallet 115A into a loading zone, the environmental conditions in the loading zone may result in the RFID portals 110C and 110D initially detecting the RFID tagged packages 120 on the pallet 115A. As such, if the location tracker 135 determines a location in response to which portal 110 first detected the RFID tagged package 120, the location tracker 135 may determine the pallet 115A is in front of the dock door 105B (which corresponds to RFID portals 110C and 110D). Assuming the desired destination for the pallet 115A is the dock door 105A, the location tracker 135 may dispatch an associate to move the pallet 115A to the dock door 105A. However, when arriving at the loading zone, the associate determines that the pallet 115A is already at the correct destination—i.e., the dock door 105A. Thus, because of the high density of RFID readers in the loading zone, as well as the noisy and dynamic nature of the environment, the RFID readers can detect stationary or transient RFID tagged packages 120 which are physically located in different locations than the locations assigned to the reader.

In one embodiment, the location tracker 135 aggregates RFID reads (referred to herein as RFID events) by the RFID portals 110 to determine a location of the RFID tagged packages 120 in the loading area—e.g., the area near the dock doors 105. That is, instead of relying on the first RFID event to determine where the RFID tagged packages 120 are located, the location tracker 135 may evaluate multiple RFID events over a defined period of time. In one embodiment, once the location tracker 135 receives a threshold number of RFID events (e.g., at least five RFID reads of a tag), the location tracker 135 chooses the location that has the most number of corresponding RFID events as the location of the tagged package 120. For example, if the RFID portal 110A reads a particular RFID tagged package 120 five times, the RFID portal 110B reads the same RFID tagged package 120 four times, and the RFID portal 110C reads the same RFID tagged package 120 two times, the inventory tracker system 130 assigns the loading zone for the dock door 105A as the new location of the package 120 even though the portal 110C (which is assigned to the dock door 105B) also detected the package 120. In this manner, the location tracker 135 can reduce the likelihood that the high density of RFID portals 110 and the noisy environment in the warehouse 100 generate a false positive where the tracker 135 determines the RFID tagged packages 120 are in wrong physical locations.

Figure 2:
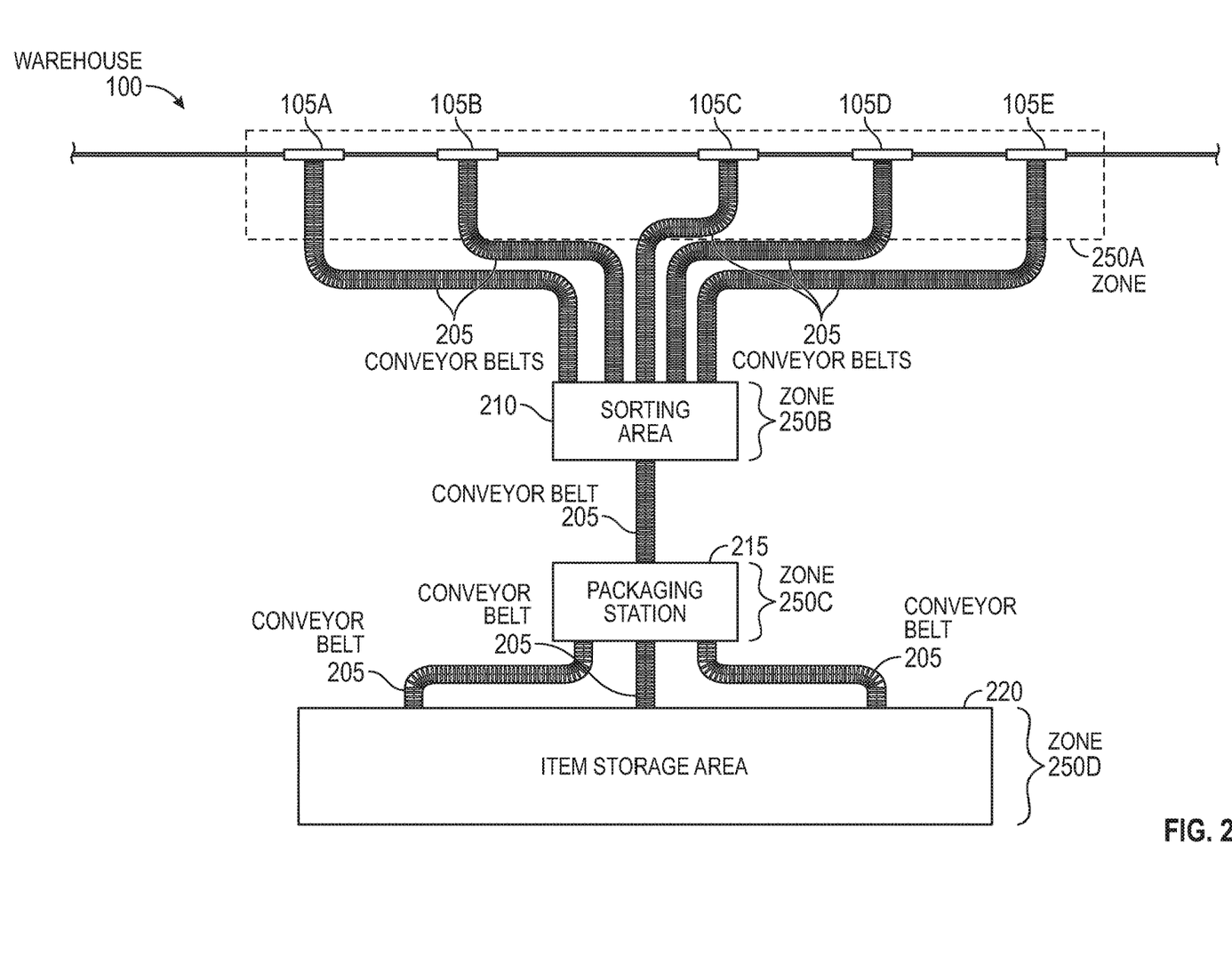
FIG. 2 is a top view of a warehouse that includes multiple zones for processing RFID tagged items, according to various embodiments.

FIG. 2 is a top view of a warehouse 100 that includes multiple zones 250 for processing RFID tagged items, according to various embodiments. As shown, the warehouse 100 includes a zone 250D which includes an item storage area 220 for storing unpackaged items. For example, the item storage area 220 may include shelves that store unpackaged items in bins or containers. In one embodiment, the item storage area 220 includes robots that can lift and move the individual shelves to a picking station where an associate or another robot can retrieve an ordered item from a bin. A robot can then return the shelf to a location in the area 220. However, in another embodiment, an associate may have an order sheet which she uses to retrieve items stored in the shelves in the item storage area 220. In either scenario, the retrieved items can be disposed on a conveyor belt 205 which carries the items to zone 250C.

The zone 250C includes packaging stations 215 which place the retrieved items into a package for shipping. The type of packaging can depend on the size of the item. For example, small items (e.g., with dimensions less than a foot) may be placed in a padded envelope while larger items are placed in cardboard box. Moreover, a box may be used if the customer order includes multiple items.

In one embodiment, each packaging station 215 is staffed with an associate who decides the appropriate packaging for the item. The associate may also place a shipping label on the packaging that includes the mailing address of the customer. In addition to the shipping label, the associate can place an RFID tag on the package. However, in other embodiments, the RFID tag may be included in the packaging itself or may be part of the shipping label rather than a separate substrate or sticker which is attached to the package.

The inventory tracking system links the ID of the RFID tag which was placed on the package with the item or items in the package. For example, when attaching the RFID tag, the packaging station 215 may transmit the unique ID corresponding to the RFID tag to the inventory tracking system. Thus, anytime the RFID tag is identified by the RFID portals in the warehouse 100, the inventory tracking system can correlate the location of the RFID tag to the package (and the items in the package). Stated differently, by tracking the RFID tag, the inventory tracking system can also identify and track the location of the items in the package.

Instead of using associates to package the items, in another embodiment, the packaging stations 215 can include autonomous robots or machines which package the items. For example, before reaching the packaging stations 215, the items may be sorted by size so that the items reach machines or robots specially designed to package items of similar size. The robot or machine can place the item in the package and then on a conveyor belt 205 which carries the packaged items to a sorting area 210 in zone 250B.

Although not shown, the zone 250B may include RFID readers along the conveyor belt 205 for identifying the RFID tagged packages sent from the zone 250C. As the packages enter into the zone 250B, the RFID readers can detect the IDs corresponding to the tags and inform the inventory tracking system. In response, the inventory tracking system can update the location of the packaged items in the warehouse 100. That is, the location tracker can determine that the items have moved from the zone 250C to the zone 250B.

In one embodiment, the sorting area 210 includes a frame which establishes a plurality of bins or shelves for receiving the packaged items. For example, the frame may include an array of bins arranged in rows and columns. In one embodiment, an associate uses information on the shipping label (e.g., the destination of the package) to decide where to sort the package. For example, the packages may be sorted using a postal code, a destination warehouse, or a delivery company which will deliver the packages to the customer.

In another embodiment, the associate may scan a bar code on the shipping label or package, and in response, the inventory tracking system may activate lights in or near the bin where the associate should place the package. Instead of scanning a bar code, the associate could wear a glove or vest that has an RFID reader which reads the RFID tag on the package. Using the ID, the inventory tracking system can activate lights near the bin that is assigned to the package's destination. In this manner, instead of the associate having to determine where to sort the package, the inventory tracking system can activate lights which inform the associate the correct bin for the package.

In one embodiment, the sorting area 210 can include a sorting machine that sorts the packages into the bins. For example, the sorting machine can include an input attached to the conveyor belt 205 coupled to the packaging stations 215. By scanning a bar code or reading an RFID tag, the sorting machine can identify the bin in which the package should be placed. The sorting machine can include track-mounted robots which carry the packages to the appropriate bin. Regardless whether an associate or a sorting machine sorts the packages, once a bin is full or contains all the packages for a particular destination, the packages can be placed on a conveyor belt and sent to zone 250A for loading.

As shown, the zone 250A includes the dock doors 105 and the loading zones in front of the doors 105. In one embodiment, the conveyor belts 205 can be set up to extend through the dock doors 105 and into a parked truck. An associate can then stack the packages in the truck as they arrive. In another example, the zone 250A includes a pallet building area where associates retrieve the packages from the conveyor belts 205 and place them in a pallet. The associate can use a hand truck or powered industrial truck (PIT) for moving the pallets through the dock doors 105 and into a truck.

Because the packages may dwell in the zone 250A (e.g., remain stationary in the loading area while waiting to be moved into a truck), the packages may be read several times by RFID readers in the zone 250A. That is, unlike in the zone 250B where the packages may pass by the RFID readers near the conveyor belt without stopping, in the zone 250A the packages may remain stationary in the loading area (e.g., within the read region of one or more RFID readers) for an extended period of time. As such, the likelihood that multiple RFID readers detect the same package is increased. For example, as the physical environment around the package changes, an RFID reader in a neighboring dock door may detect the package. As mentioned above, this can cause the inventory tracking system to assign the wrong location to the package. For example, the package may be placed in a loading area in front of the dock door 105A but be detected by the RFID reader in front of dock door 105B. Thus, the location tracker may mistakenly determine that the package is in front of the dock door 105B. Thus, the location tracker may use a different algorithm for determining the location of the packages in the zone 205A than in the zone 205B. In one embodiment, the location tracker accumulates multiple RFID read events before determining the location of the package in the zone 205A.

Figure 3:
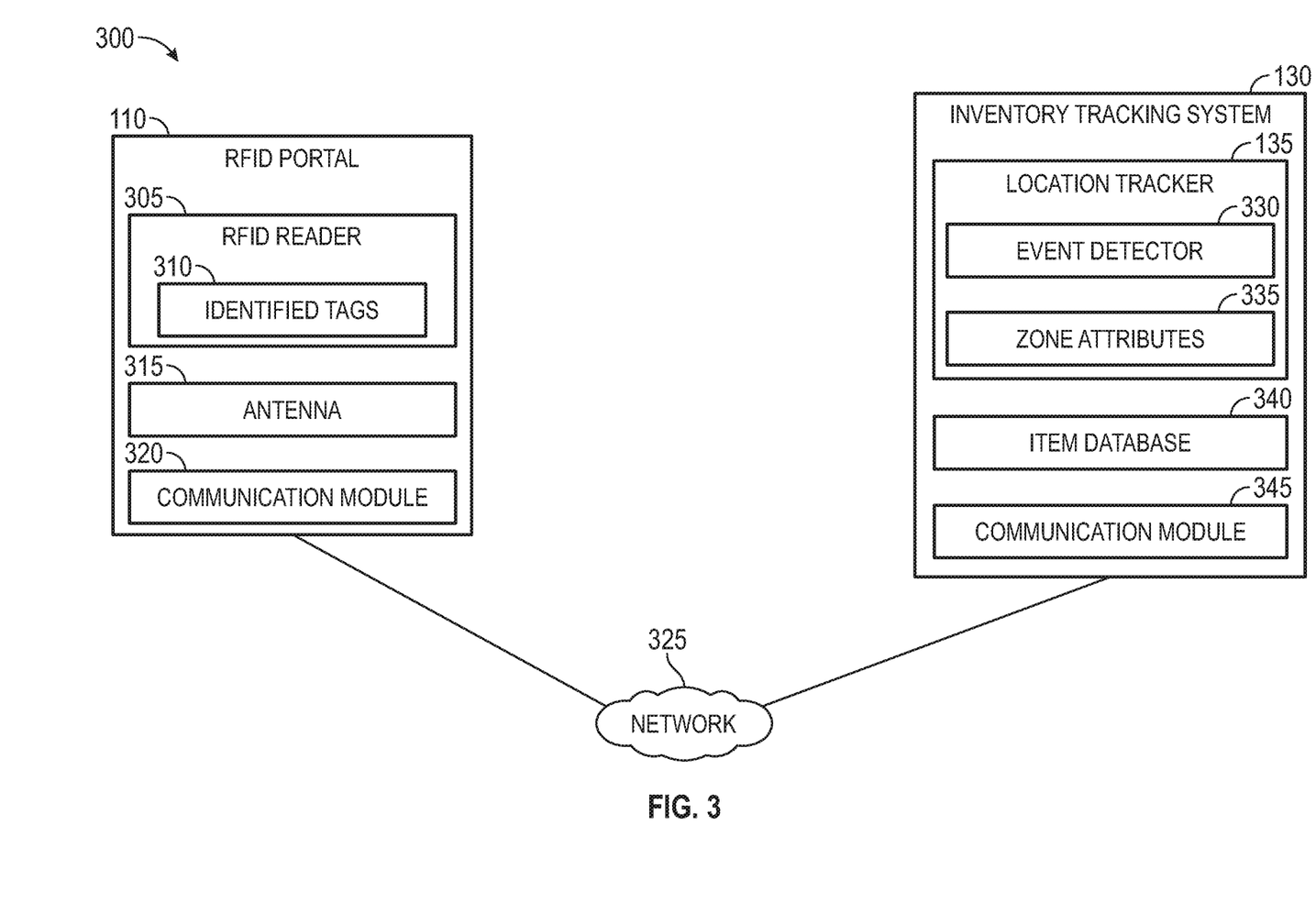
FIG. 3 is a block diagram of a system for tracking RFID tagged packages in a warehouse, according to various embodiments.

FIG. 3 is a block diagram of a system for tracking RFID tagged packages in a warehouse, according to various embodiments. The system includes the RFID portal 110, the inventory tracking system 130, and a network 325. The RFID portal 110 includes an RFID reader 305, an antenna 315, and a communication module 320. The RFID reader 305 can use the antenna 315 to transmit and receive RFID signals from RFID tags (not shown) on the packages in the warehouse. Although one antenna 315 and RFID reader 305 is shown, the RFID portal 110 can include any number of antennas 315 and readers 305. For example, the RFID portal 110 may include one reader 305 coupled to multiple antennas 315, or multiple readers 305 that are each coupled to a respective antenna 315. For example, one antenna 315 may be arranged to detect RFID tagged packages near the portal 110 while another antenna 315 in the same portal 110 is arranged to detect RFID tagged packages further away from the portal 110.

The communication module 320 transmits tags 310 identified by the RFID reader 305 to the inventory tracking system 130 via the network 325. The communication module 320 may have a wired or wireless connection to the network 325. The network 325 can be a local area network (LAN) or a wide access network (WAN) such as the Internet. For example, the inventory tracking system 130 can be hosted by a computing system (which includes one or more processors and memory) in the same warehouse as the RFID portal 110 or in a remote data center. For example, the inventory tracking system 130 can be an application or service that is hosted in a cloud computing environment which communicates with the RFID portal 110 using the network 325.

The inventory tracking system 130 includes the location tracker 135 (e.g., a software application), an item database 340, and a communication module 345. The location tracker 135 includes an event detector 330 and zone attributes 335. The event detector 330 receives the identified tags 310 from the RFID reader 305 and generates RFID events that are evaluated by the location tracker 135 to determine a location of the packages corresponding to the identified tags 310. Put differently, using the RFID events generated by the event detector 330, the location tracker 135 can update the location of the packages saved in the item database 340.

In one embodiment, the algorithm used by the location tracker 135 to determine a location of the packages (and the corresponding items) changes depending on the zone attributes 335 for the particular zone. For example, the zone attributes 335 for the zone 250B may be different than the zone attributes 335 for the zone 250A which changes the algorithm used by the location tracker 135 to detect locations of packages within those zones. In one embodiment, the zone attributes 335 for the zone 250B indicate that the location tracker 135 determines a location of the package based on a single RFID event—e.g., whichever RFID reader 305 first detects the package. However, the zone attributes 335 for the zone 250A may instruct the location tracker 135 to use an aggregate of RFID events to determine the location of each package as they enter the zone 250A. In one embodiment, when generating an RFID event, the event detector 330 determines which RFID portal 110 detected the event. The location tracker 135 then uses the corresponding zone attributes 335 to determine how to determine a location of the package that has entered the zone.

The communication module 345 can have a wired or wireless connection to the network 325. The communication module 345 permits the inventory tracking system 130 to communicate via the network 325 with the RFID portals 110 in the warehouse which may be scattered among different zones, or at least the zones which have RFID tagged items or packages.

Figure 4:
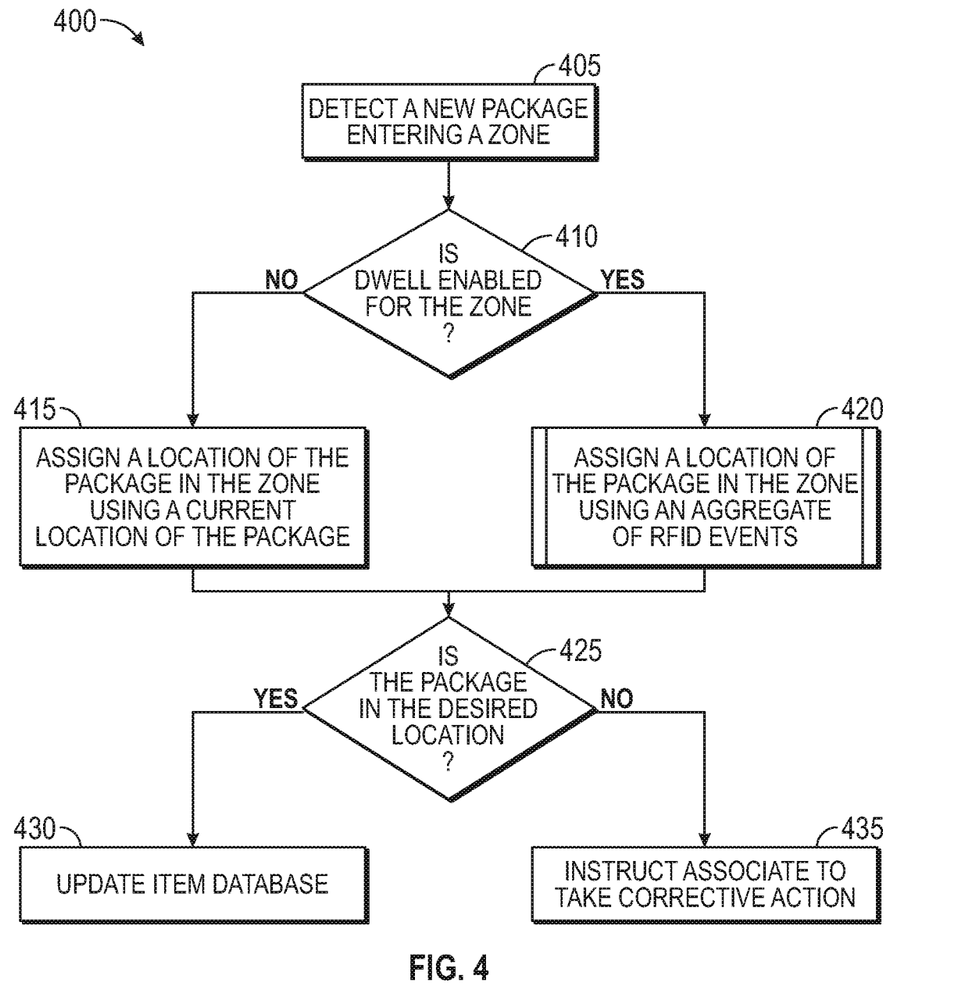
FIG. 4 is a flowchart for tracking RFID tagged packages in a warehouse, according to various embodiments.

FIG. 4 is a flowchart of a method 400 for tracking RFID tagged items in a warehouse, according to various embodiments. At block 405, the event detector in the location tracker detects a new package entering a zone. For example, the event detector can continuously, or at intervals, receive a list of RFID tags detected by the RFID readers distributed throughout the warehouse. Using a list of previously detected tags, the event detector can determine if the current list includes a new RFID tag that was not in the previously received lists. In this manner, the event detector can determine if it is the first time the package has entered the zone.

However, some zones may have multiple RFID portals and readers. For example, while the zone 250B shown in FIG. 3 may have only one RFID portal (which is located on the conveyor between the zone 250C and the zone 250B, the zone 250A may have multiple RFID portals—e.g., one or more portals disposed at each dock door. Thus, to determine whether it is the first time a package has entered the zone 250A, the event detector may evaluate the identified tags received from all the RFID portals to determine whether any of the portals have previously detected the RFID tag.

After detecting a new package, the method 400 proceeds to block 410 where the location tracker determines whether a dwell feature is enabled for the zone. In one embodiment, the location tracker uses the zone attributes corresponding to the zone to determine whether the dwell feature is enabled. That is, when detecting a new package has entered a zone, the event detector can provide the location tracker with a zone ID. In response, the location tracker can look-up the zone attributes for that zone to determine if it has the dwell feature enabled.

For zones where items are transient or where there is not a high density of RFID readers, the dwell feature may be disabled. For example, where the RFID portal is located on a conveyor belt or a zone only has a few RFID readers which are spread apart, the zone attributes disable the dwell feature. In that case, the method 400 proceeds to block 415 where the location tracker assigns a location of the package in the zone using the current location of the package. That is, the location tracker updates the location of the package in the item database to correspond to the location of the RFID reader which triggered the RFID event at block 405. Thus, in this example, the package is assigned a location in the zone corresponding to the first RFID reader in the zone that detects the new package.

However, if the dwell feature is enabled for the zone, the method 400 proceeds to block 420 where the location tracker assigns a location of the package in the zone using an aggregate of RFID events. That is, instead of using only one RFID event, the location tracker evaluates multiple RFID events before assigning a location of the package in the zone. For the zone 250A shown in FIG. 3 (which includes a high density of RFID portals and stationary packages), the location tracker may have a threshold number of RFID events it must receive before deciding in which loading zone the package is located. Block 420 is discussed in more detail in the later figures.

After determining the location of the package in the zone, at block 425, the inventory tracking system determines whether the package is in the desired location. For example, the package should be shipped out on the truck parked at the dock door 105B but an associate may have erroneously placed the package in front of the dock door 105C. Thus, using the location identified using the RFID tags and portals, the inventory tracking system can compare that location to the desired location of the package to ensure the package is routed correctly through the warehouse and out the appropriate dock door. In one embodiment, the item database may store both the RFID identified location of the package (or the item in the package) as well as the desired location of the package. For example, the item database may store a desire location of the package in each of the zones—e.g., a particular packaging station, a particular bin in the sorting area, and a particular loading zone. By referencing the item database, the inventory tracking system can determine when a package has been incorrectly routed in the warehouse.

If at block 425 the inventory tracking system determines the package is at the desired location in the zone, the method 400 proceeds to block 430 where the inventory tracking system updates the item database to indicate the current location of the package in the warehouse. That is, in this example, the inventory tracking system may wait to update the current location of the package until determining the package is at the desired location in the zone.

However, if the package is not at the desired location, the method 400 proceeds to block 435 where the inventory tracking system instructs the associate to take a corrective action. For example, the inventory tracking system may send a text or audio message to a personal electronic device carried by an associate informing her of the mis-routed package. Once the problem is rectified, the associate can them inform the inventory tracking system using the personal device. For example, if the package is sent to the wrong packing station or wrong dock door, the associate may move the package and then inform the inventory tracking system.

Figure 5:
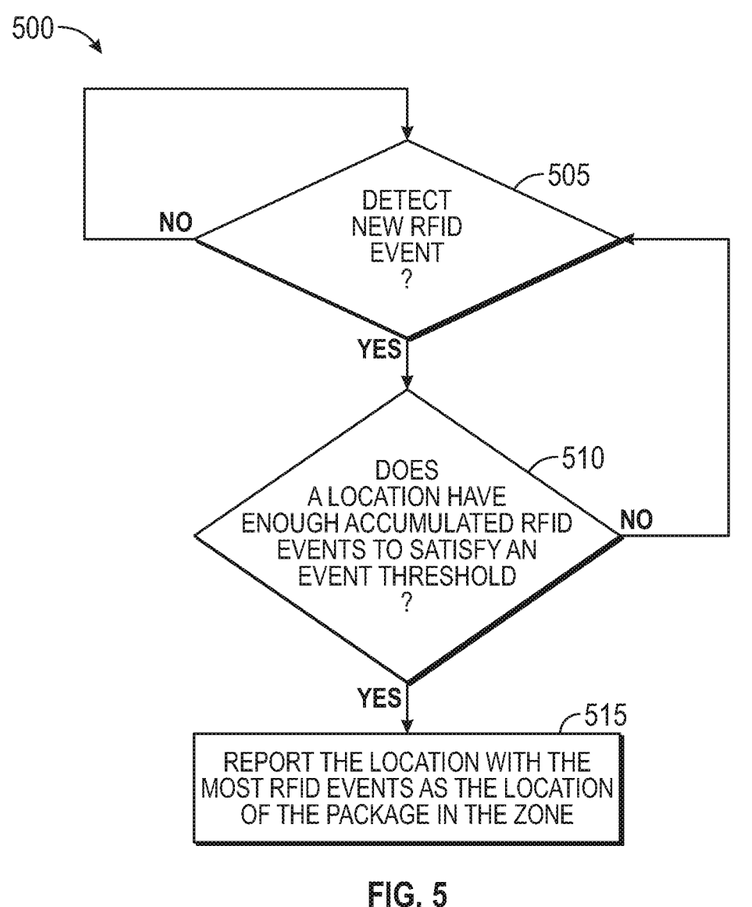
FIG. 5 is a flowchart for aggregating RFID events to determine a location of an RFID tagged item in a warehouse, according to various embodiments.

FIG. 5 is a flowchart of a method 500 for aggregating RFID events to determine a location of an RFID tagged item in a warehouse, according to various embodiments. In one embodiment, the method 500 may be performed at block 420 in the method 400. That is, the location tracker may use the method 500 to assign a location of the package in the zone using an aggregate of RFID events.

At block 505, the event detector determines if a new RFID event is detected. In one embodiment, the RFID events are detected using an RFID portal (or portals) in the zone the package has entered. For example, after detecting a new package in the zone (e.g., detecting the package for the first time at one of the RFID portals in the zone), the event detector continues to monitor the RFID portals in the zone to determine which (if any) of the other RFID portals in the zone also detect the package. This may be advantageous in a zone with a high density of RFID portals since the first portal to detect the package may not be the portal closest to the package, and thus, does not accurately reflect of the location of the package in the zone.

When a new RFID event is detected, either by the RFID portal that first detected the package or by another RFID portal in the zone, the method 400 proceeds to block 510 where the location tracker determines if one of the locations corresponding to the RFID portals has enough accumulated RFID events to satisfy an event threshold. That is, the location tracker may wait until the tag is detected by the RFID portal (or portals) assigned to a particular location in the zone a threshold number of times before assigning the location of the package in the zone. For example, the package may have been detected three times by the RFID portals assigned to the dock door 105A, four times by the RFID portals assigned to the dock door 105B, and once by the RFID portals assigned to the dock door 105C. However, the system administrator may require that a particular location detect the RFID tag on the package at least five times. If none of the locations in the zone satisfy the event threshold, the method 500 returns to block 505 to wait for another RFID event. For example, the RFID readers in the portals may continuously, or at predefined intervals, perform read cycles to identify the RFID tags in their read regions. For example, the RFID readers may perform a read cycle every few seconds and provide updated lists of detected RFID tags to the event detector.

If, however, at block 510 the location tracker determines a location in the zone now has enough accumulated RFID events to satisfy the event threshold, the method 500 proceeds to block 515 where the location tracker reports the location with the most RFID events as the location of the package in the zone. Stated differently, the location tracker assigns the location of the package to the location in the zone with the RFID portal or portals that read the RFID tagged package enough times to satisfy the event threshold.

Figure 6:
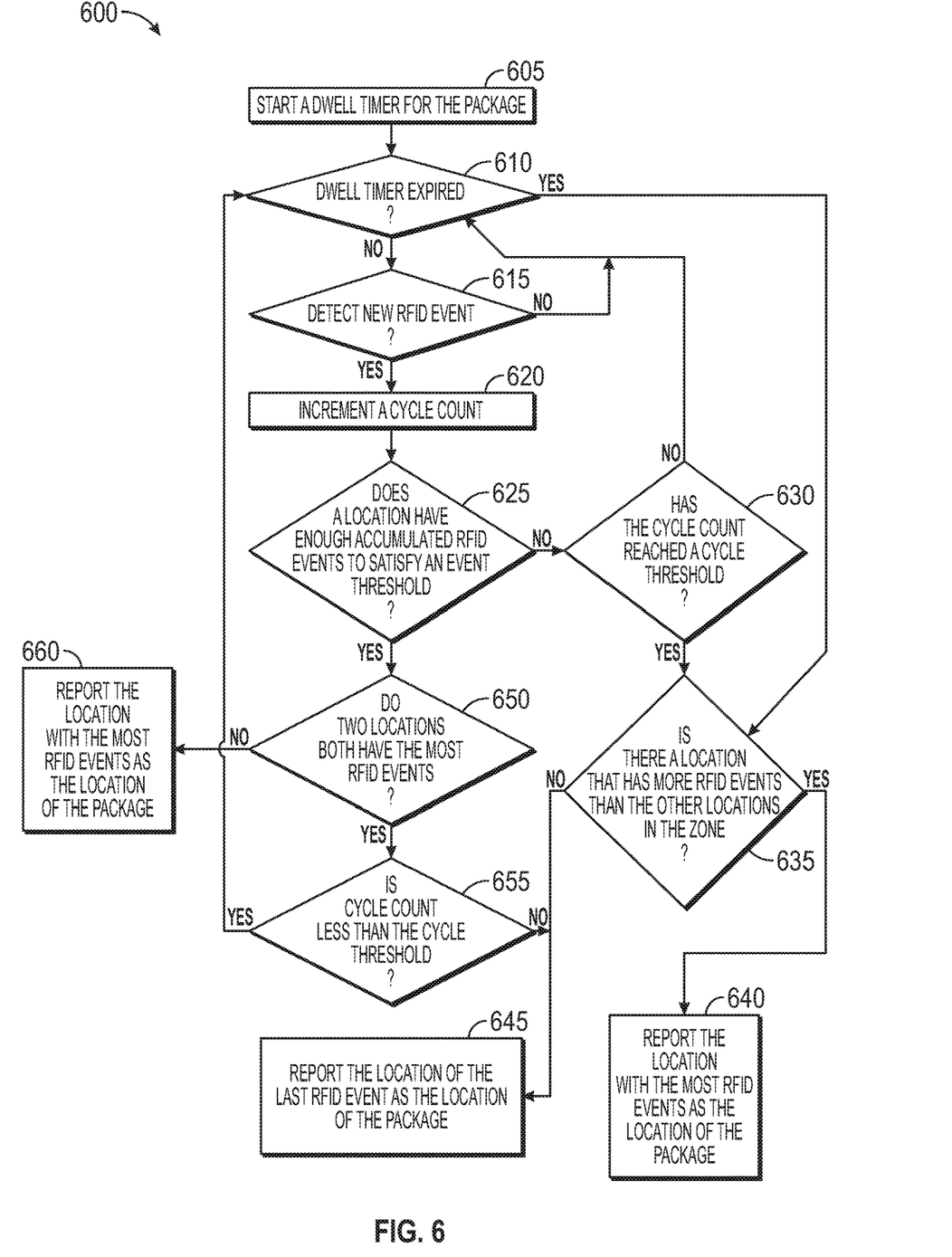
FIG. 6 is a flowchart for aggregating RFID events to determine a location of an RFID tagged item in a warehouse, according to various embodiments.

FIG. 6 is a flowchart of a method 600 for aggregating RFID events to determine a location of an RFID tagged item in a warehouse, according to various embodiments. In one embodiment, the method 600 may be performed at block 420 in the method 400. That is, the location tracker may use the method 600 to assign a location of the package in the zone using an aggregate of RFID event.

At block 605, the location tracker starts a dwell timer for the package. That is, as a new package enters the zone, the location tracker starts a corresponding dwell timer for the package. In one embodiment, the dwell timer indicates the maximum time RFID events for the RFID tagged item can be aggregated by the location tracker before reporting the location of the RFID tagged item. In one embodiment, the dwell timer has the same initial value (e.g., twenty seconds) for each of the packages. However, because the packages may enter the zone at different times, the values of the dwell timers may be different.

At block 610, the location tracker determines if the dwell timer has expired. Assuming this is the first time the package has been detected by an RFID portal in the zone (and thus, the dwell timer has not expired), the method 600 then proceeds to block 615 where the event detector waits for a new RFID event. In one embodiment, the RFID events are detected using an RFID portal (or portals) in the zone the package has entered. For example, after detecting a new package in the zone (e.g., detecting the package for the first time at one of the RFID portals in the zone), the event detector continues to monitor the RFID portals in that zone to determine which (if any) of the other RFID portals in the zone also detect the package. If during the subsequent read cycle none of the RFID portals in the zone detect the package, the method 600 returns to block 610 to determine if the dwell timer has expired. In this manner, the method 600 is event driven where the remaining portion of the method 600 is executed after receiving a new RFID event from an RFID portal in the zone.

Assuming at least one of the RFID portals detects the package, the method 600 proceeds to block 620 where a cycle count associate with the package is incremented. The cycle count represents the number of times the package has been detected by the RFID portals in the zone. In one embodiment, the cycle count is incremented for each RFID portal that detects the package. For example, if during the same read cycle two RFID portals detect the package, then the cycle count is incremented by two during block 620. However, in another embodiment, the cycle count may be incremented by one during each read cycle regardless of the number of RFID portals that read the package.

At block 625, the location tracker determines whether one of the locations in the zone has enough accumulated RFID events to satisfy an RFID event threshold. As mentioned above, the system administrator may require that the RFID portal or portals for a particular location (e.g., a loading zone or dock door) in the zone read the tagged package at least five times before proceeding to block 650.

Assuming at least one location in the zone has an RFID portal that has detected the package enough times to satisfy the event threshold, at block 650 the location tracker determines whether two locations both have the most RFID events. As mentioned above, during a read cycle, RFID portals assigned to two different locations in the zone (e.g., two different dock doors) can both detect the tagged package. Assuming these two locations already have the same number of RFID read events for the package, then both locations have the same number of RFID events (and satisfy the event threshold). That is, there is a tie where two or more locations in the zone both have the same number of RFID events for the package. If there is not a tie and one location in the zone has more RFID events than the other locations, the method 600 proceeds to block 660 where the location tracker reports this location (i.e., the location with the most RFID events) as the location of the package.

However, if there is a tie, the method 600 proceeds to block 655 where the location tracker determines if the cycle count is less than a cycle count threshold. In one embodiment, the cycle count threshold represents the maximum number of times the package is read by the portals in the zone before the location tracker needs to make a decision about the location of the package. If the cycle count has not reached the threshold, then the location tracker does not yet need to determine the location of the package and can return to block 610 to ensure the dwell timer has not expired and then to block 615 to wait for a new RFID event. For example, the next RFID event may break the tie between the locations (i.e., where the RFID portal in one of the locations detects the package but the other does not) so that the method 600 can assign the location of the package to the location in the zone with the most RFID events at block 660.

However, if the cycle count has reached the cycle threshold at block 655 (and there is still a tie for the most RFID events), the method 600 proceeds to block 645 where the location tracker reports the location of the last RFID event (i.e., the most recent RFID event) as the location of the package. That is, because the cycle count has reached the threshold, the location tracker is forced to determine the location of the package using the information it has. In this case, the location tracker picks the location corresponding to the most recent RFID event of the locations that have the same number of RFID events. That is, between the locations that tied for having the most RFID events, the location tracker chooses the location that had the most recent RFID event. For example, when reporting the identified tags to the event detector, the RFID portals may provide a timestamp when the read occurred. Using the timestamps, the location tracker can detect which RFID portal most recently detected the package and assign the location of that portal to the location of the package.

Returning to block 625, if none of the locations in the zone have enough RFID events to satisfy the event threshold, the method 600 proceeds to block 630 where the location tracker determines whether the cycle count has reached the cycle threshold. As mentioned above, the cycle threshold may limit the number of times the RFID portals can read the package before the location tracker decides on the location of the package. If the cycle count has not reached the threshold, the method 600 returns to block 610 where the location tracker again determines whether the dwell timer has expired. However, if the dwell timer has expired or the cycle count has reached the threshold, the method 600 proceeds to block 635 where the location tracker determines if there is a location that has more RFID events than the other locations in the zone. Put differently, once the dwell timer expires or the cycle count reaches the threshold, the location tracker is forced to make a decision on the location of the package. At block 635, the location tracker determines if there is a location that has the more RFID events than all the other locations in the zone, regardless if that location satisfies the event threshold. If so, the method 600 proceeds to block 640 where the location tacker reports the location with the most RFID events as the location of the package even though this location does not satisfy the event threshold.

However, if there is a tie for the most RFID events, the method proceeds to block 645 where the location tracker reports the location of the last RFID event as the location of the package. If multiple locations have the same timestamp (e.g., detected the events at the same time), the location tracker can select the location that has the most RFID events for the package between those locations. If these locations also have the same number of overall RFID events, the location tracker can select one of the locations at random or report an error and require an associate to identify the package and report the correct location of the package to the inventory tracking system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used to implement embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   determining that an RFID tagged package has entered a zone in a warehouse containing a plurality of RFID portals, wherein each of the RFID portals is assigned to a different respective location in the zone;
   detecting, by at least two of the plurality of RFID portals, a plurality of RFID reads corresponding to the RFID tagged package before the RFID tagged package has been assigned a location in the zone;
   starting a first dwell timer for a the RFID tagged package when the RFID tagged package is first detected by one of the at least two of the plurality of RFID portals,
   aggregating the plurality of RFID reads corresponding to the RFID tagged package during the first dwell timer using the at least two of the plurality of RFID portals;
   determining the first dwell timer has expired before the at least two of the plurality of RFID portals have accumulated enough RFID reads of the RFID tagged package to satisfy a nonzero predefined RFID read threshold;
   determining the location of the RFID tagged package based on which of the at least two of the plurality of RFID portals have more accumulated RFID reads of the RFID tagged package, even though neither of the at least two of the plurality of RFID portals has satisfied the nonzero predefined RFID read threshold;
   incrementing a cycle count for each of the plurality of RFID reads, the cycle count indicating the total number of times the at least two of the plurality of RFID portals have read the RFID tagged package;
   determining a first location of the RFID tagged package based on which of the at least two of the plurality of RFID portals have more accumulated RFID reads of the RFID tagged package, even though neither of the at least two of the plurality of RFID portals has satisfied the nonzero predefined RFID read threshold; and
   reporting the first location as a location of the RFID tagged package.

2. The method of claim 1, wherein the first dwell timer indicates the maximum time RFID reads for the RFID tagged package can be aggregated before reporting the location of the RFID tagged package.

3. The method of claim 2, further comprising:
   determining that a second RFID tagged package has entered the zone in the warehouse; and
   starting a second dwell timer corresponding to the second RFID tagged package, wherein the first dwell timer and second dwell timer are active at the same time but have different timer values.

4. The method of claim 3, further comprising, after determining that the second RFID tagged package has enough accumulated RFID reads to satisfy the nonzero predefined RFID read threshold:
   determining that a second location and a third location in the zone have the same number of accumulated RFID reads.

5. The method of claim 4, further comprising, before reporting a location of the second RFID tagged package:
   determining that a cycle count for the second RFID tagged package is less than a cycle count threshold;
   detecting an additional RFID read corresponding to the second RFID tagged package using a first RFID portal of the plurality of RFID portals and incrementing the cycle count; and
   determining that the second location has more accumulated RFID reads than the third location.

6. The method of claim 1, wherein the warehouse comprises a second zone with a plurality of RFID readers, the method further comprising:
   assigning the location of a second RFID tagged package entering the second zone to a location of an RFID reader of the plurality of RFID readers which first detects the second RFID tagged package.

7. A method, comprising:
   starting a dwell timer for an RFID tagged item when the RFID tagged item is first detected by one of a first or second RFID reader, wherein the dwell timer indicates the maximum time RFID reads for the RFID tagged item can be aggregated using the first and second RFID readers before reporting the location of the RFID tagged item;
   aggregating a plurality of RFID reads corresponding to the RFID tagged item during the dwell timer, wherein a first number of the plurality of RFID reads are detected by the first RFID reader and a second number of the plurality of RFID reads are detected by the second RFID reader, wherein the first RFID reader is assigned to a first location and the second RFID reader is assigned to a second location different from the first location, wherein, due to changes in a physical environment containing the first and second RFID reader, a read region of the second RFID reader extends, at least intermittently, into the first location assigned to the first RFID reader;
   determining that the first number is more than the second number and that the first number satisfies a nonzero predefined RFID read threshold;
   reporting the first location as a location of the RFID tagged item;
   starting a second dwell timer for a second RFID tagged item when the second RFID tagged item is first detected by one of a first or second RFID reader;

aggregating a second plurality of RFID reads corresponding to the second RFID tagged item during the second dwell timer using the first and second RFID readers;
determining the second dwell timer has expired before the first or second RFID readers have accumulated enough RFID reads of the second RFID tagged item to satisfy the nonzero predefined RFID read threshold; and
determining the location of the second RFID tagged item based on which of the first or second RFID readers have more accumulated RFID reads of the second RFID tagged item, even though neither the first RFID reader nor the second RFID reader has satisfied the nonzero predefined RFID read threshold.

8. The method of claim 7, wherein aggregating the plurality of RFID reads comprises:
    incrementing a cycle count each time an RFID read is detected; and
    determining that the cycle count does not exceed a cycle count threshold before reporting the first location as the location of the RFID tagged item.

9. The method of claim 7, wherein aggregating the plurality of RFID reads comprises:
    incrementing a cycle count each time an RFID read is detected;
    determining that the first number and the second number are the same;
    determining that the cycle count is less than a cycle count threshold; and
    detecting an additional RFID read corresponding to the RFID tagged item using the first RFID reader, thereby increasing the first number relative to the second number.

10. The method of claim 7, further comprising:
    aggregating a second plurality of RFID reads corresponding to a second RFID tagged item, wherein a first number of the second plurality of RFID reads are detected by the first RFID reader and a second number of the second plurality of RFID reads are detected by the second RFID reader; and
    determining that a cycle count corresponding to the second plurality of RFID reads exceeds a cycle count threshold and that neither the first number of the second plurality of RFID reads nor the second number of the second plurality of RFID reads satisfy the nonzero predefined RFID read threshold.

11. The method of claim 10, further comprising:
    determining that the first number of the second plurality of RFID reads is larger than the second number of the second plurality of RFID reads; and
    reporting the first location as the location of the second RFID tagged item.

12. The method of claim 10, further comprising:
    determining that the first number of the second plurality of RFID reads is the same as the second number of the second plurality of RFID reads;
    determining that the most recent RFID read of the plurality of RFID reads was detected by the first RFID reader assigned to the first location; and
    reporting the first location as the location of the second RFID tagged item.

13. A system, comprising:
    a first RFID reader assigned to a first location;
    a second RFID reader assigned to a second location different from the first location, wherein the first and second RFID readers are arranged such that changes in a physical environment containing the first and second RFID readers cause a read region of the second RFID reader to extend, at least intermittently, into the first location assigned to the first RFID reader;
    a processor; and
    a memory comprising a location tracker application, wherein, when executed by the processor, the location tracker application performs an operation, the operation comprising:
        starting a dwell timer for an RFID tagged item when the RFID tagged item is first detected by one of the first and second RFID readers, wherein the dwell timer indicates the maximum time RFID reads for the RFID tagged item can be aggregated using the first and second RFID readers before reporting the location of the RFID tagged item;
        aggregating a plurality of RFID reads corresponding to the RFID tagged item during the dwell timer, wherein a first number of the plurality of RFID reads are detected by the first RFID reader and a second number of the plurality of RFID reads are detected by the second RFID reader;
        determining that the first number is more than the second number and that the first number satisfies a nonzero predefined RFID read threshold;
        reporting the first location as a location of the RFID tagged item;
        starting a second dwell timer for a second RFID tagged item when the second RFID tagged item is first detected by one of a first or second RFID reader;
        aggregating a second plurality of RFID reads corresponding to the second RFID tagged item during the second dwell timer using the first and second RFID readers;
        determining the second dwell timer has expired before the first or second RFID readers have accumulated enough RFID reads of the second RFID tagged item to satisfy the nonzero predefined RFID read threshold; and
        determining the location of the second RFID tagged item based on which of the first or second RFID readers have more accumulated RFID reads of the second RFID tagged item, even though neither the first RFID reader nor the second RFID reader has satisfied the nonzero predefined RFID read threshold.

14. The system of claim 13, wherein aggregating the plurality of RFID reads comprises:
    incrementing a cycle count each time an RFID read is detected; and
    determining that the cycle count does not exceed a cycle count threshold before reporting the first location as the location of the RFID tagged item.

15. The system of claim 13, wherein aggregating the plurality of RFID reads comprises:
    incrementing a cycle count each time an RFID read is detected
    determining that the first number and the second number are the same;
    determining that the cycle count is less than a cycle count threshold; and
    detecting an additional RFID read corresponding to the RFID tagged item using the first RFID reader, thereby increasing the first number relative to the second number.

16. The system of claim 13, wherein the operation further comprises:
    aggregating a second plurality of RFID reads corresponding to a second RFID tagged item, wherein a first number of the second plurality of RFID reads are detected by the first RFID reader and a second number of the second plurality of RFID reads are detected by the second RFID reader; and determining that a cycle count corresponding to the second plurality of RFID reads exceeds a cycle count threshold and that neither the first number of the second plurality of RFID reads nor the second number of the second plurality of RFID reads satisfy the RFID read threshold.

17. The system of claim 16, wherein the operation further comprises:

determining that the first number of the second plurality of RFID reads is larger than the second number of the second plurality of RFID reads; and reporting the first location as the location of the second RFID tagged item.

18. The system of claim 16, wherein the operation further comprises:

determining that the first number of the second plurality of RFID reads is the same as the second number of the second plurality of RFID reads;

determining that the most recent RFID read of the plurality of RFID reads was detected by the first RFID reader assigned to the first location; and reporting the first location as the location of the second RFID tagged item.

* * * * *

UNITED STATES PATENT AND TRADEMARK OFFICE
CERTIFICATE OF CORRECTION

Page 1 of 1

PATENT NO.         : 11,257,030 B1
APPLICATION NO.    : 15/861355
DATED              : February 22, 2022
INVENTOR(S)        : Oleg Kantor et al.

It is certified that error appears in the above-identified patent and that said Letters Patent is hereby corrected as shown below:

In the Claims

In Column 13, Line 41, in Claim 1, delete "a the" and insert -- the --.

Signed and Sealed this
Twelfth Day of April, 2022

Drew Hirshfeld
*Performing the Functions and Duties of the
Under Secretary of Commerce for Intellectual Property and
Director of the United States Patent and Trademark Office*